United States Patent
Oka et al.

(10) Patent No.: US 8,539,919 B2
(45) Date of Patent: Sep. 24, 2013

(54) FLUID BRAKE DEVICE AND VARIABLE VALVE TIMING APPARATUS

(75) Inventors: Kuniaki Oka, Nishio (JP); Jun Yamada, Okazaki (JP); Makoto Otsubo, Anjo (JP); Shuhei Oe, Nukata-gun (JP); Taketsugu Sasaki, Nagoya (JP); Kenichi Nara, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/489,525

(22) Filed: Jun. 6, 2012

(65) Prior Publication Data

US 2012/0312260 A1    Dec. 13, 2012

(30) Foreign Application Priority Data

Jun. 9, 2011    (JP) .................. 2011-129485

(51) Int. Cl.
*F01L 1/34* (2006.01)
(52) U.S. Cl.
USPC .................... 123/90.17; 123/90.15

(58) Field of Classification Search
USPC ................................ 123/90.15, 90.17, 90.31
See application file for complete search history.

(56) References Cited

U.S. PATENT DOCUMENTS

| 7,051,688 B2 * | 5/2006 | Lancefield ................. 123/90.15 |
| 2010/0095920 A1 | 4/2010 | Morishima |

* cited by examiner

*Primary Examiner* — Zelalem Eshete
(74) *Attorney, Agent, or Firm* — Nixon & Vanderhye P.C.

(57) ABSTRACT

A fluid brake device has a rotor having a brake shaft penetrating a case to come into contact with magnetic viscosity fluid. A sealing sleeve is arranged to surround the brake shaft, and a seal gap is defined between the sealing sleeve and the brake shaft and communicates with a fluid chamber. The sealing sleeve has a flux guide that guides magnetic flux to the brake shaft through the seal gap. The brake shaft has a magnetic shaft extending in an axis direction, and a regulation layer that regulates the magnetic flux from passing by covering an outer circumference surface of the magnetic shaft. The brake shaft has an exposing part opposing to the magnetic flux guide, and the exposing part of the brake shaft is exposed from the regulation layer.

8 Claims, 9 Drawing Sheets

FLUID BRAKE DEVICE AND VARIABLE VALVE TIMING APPARATUS

CROSS REFERENCE TO RELATED APPLICATION

This application is based on Japanese Patent Application No. 2011-129485 filed on Jun. 9, 2011, the disclosure of which is incorporated herein by reference in its entirety.

TECHNICAL FIELD

The present disclosure relates to a fluid brake device and a variable valve timing apparatus having the fluid brake device.

BACKGROUND

A fluid brake device conducts variable control of viscosity of magnetic viscosity fluid by causing a magnetic flux to pass through the magnetic viscosity fluid. The magnetic viscosity fluid is filled in a fluid chamber of a casing, and contacts a brake rotor. Braking torque is provided to the brake rotor of the fluid brake device with comparatively small electric power, so that the fluid brake device is suitably used in a variable valve timing apparatus that controls a relative phase between a crankshaft and a camshaft of an engine in accordance with the braking torque.

JP-A-2010-121614 (US 2010/0095920) describes a fluid brake device having a casing and a brake shaft penetrating the casing. A sealing structure is provided in a clearance between the brake shaft and the casing. Specifically, the sealing structure is constructed by a permanent magnet and a magnetic flux guide, which are arranged to surround the brake shaft along a rotation direction. Magnetic flux generated by the permanent magnet is guided from the magnetic flux guide to the brake shaft through a seal gap between the magnetic flux guide and the brake shaft communicating with a fluid chamber. As a result, the magnetic viscosity fluid flowing into the seal gap from the fluid chamber receives the magnetic flux, so that the viscosity of the magnetic viscosity fluid is raised. Thus, the magnetic viscosity fluid is caught in a film shape as a self-sealing film.

The self-sealing film formed in the seal gap restricts the magnetic viscosity fluid from flowing outward from the casing. Thus, the magnetic viscosity fluid is restricted from leaking from the fluid chamber, so that variation can be reduced in the braking characteristics. Further, the self-sealing film made of the magnetic viscosity fluid can reduce the friction resistance for the brake shaft. Therefore, when the fluid brake device is applied to the variable valve timing apparatus, torque loss can be reduced by the reduction in the friction resistance.

However, the magnetic flux generated by the permanent magnet may be guided to not only a part of the brake shaft opposing to the magnetic flux guide but also the other part not opposing to the magnetic flux guide. In this case, the density of the magnetic flux becomes small in the seal gap, compared with a predetermined value. If pressure-resistant properties of the self-sealing film are lowered by the reduction in the density of the magnetic flux, the magnetic viscosity fluid may leak from the casing.

SUMMARY

According to an example of the present disclosure, a fluid brake device includes a case, magnetic viscosity fluid, a control device, a rotor, and a sealing sleeve. The case defines a fluid chamber inside. The magnetic viscosity fluid is kept in the fluid chamber, and has a viscosity variable in accordance with magnetic flux passing through. The control device carries out variable control of the viscosity of the magnetic viscosity fluid by varying the magnetic flux. The rotor has a brake shaft penetrating the case to come into contact with the magnetic viscosity fluid so that the rotor receives a braking torque according to the viscosity of the magnetic viscosity fluid. The sealing sleeve is arranged in the case to surround the brake shaft along a rotation direction. A seal gap is defined between the sealing sleeve and the brake shaft and communicates with the fluid chamber. The sealing sleeve has a flux guide that guides magnetic flux to the brake shaft through the seal gap. The brake shaft has a magnetic shaft extending in an axis direction, and a regulation layer that regulates the magnetic flux by covering an outer circumference surface of the magnetic shaft. The brake shaft has an exposing part opposing to the flux guide, and the brake shaft is exposed from the regulation layer through the exposing part.

According to an example of the present disclosure, a variable valve timing apparatus for adjusting valve timing of a valve which is opened and closed by a camshaft driven by torque transmission from a crankshaft in an internal combustion engine includes the fluid brake device and an angular phase adjusting mechanism engaged with the brake shaft at an outside of the case. The angular phase adjusting mechanism adjusts a relative phase defined between the crankshaft and the camshaft according to the braking torque acting on the rotor.

BRIEF DESCRIPTION OF THE DRAWINGS

Additional objects and advantages of the present disclosure will be more readily apparent from the following detailed description when taken together with the accompanying drawings. In which.

DETAILED DESCRIPTION

A plurality of embodiments of the present disclosure are explained referring to drawings. Components and parts corresponding to the components and parts described in the preceding description may be indicated by the same reference number and may not be described redundantly. In a case that only a part of component or part is described, other descriptions for the remaining part of component or part in the other description may be incorporated. The embodiments can be partially combined or partially exchanged in some forms which are clearly specified in the following description. In addition, it should be understood that, unless trouble arises, the embodiments can be partially combined or partially exchanged each other in some forms which are not clearly specified.

(First Embodiment)

Figure 1:
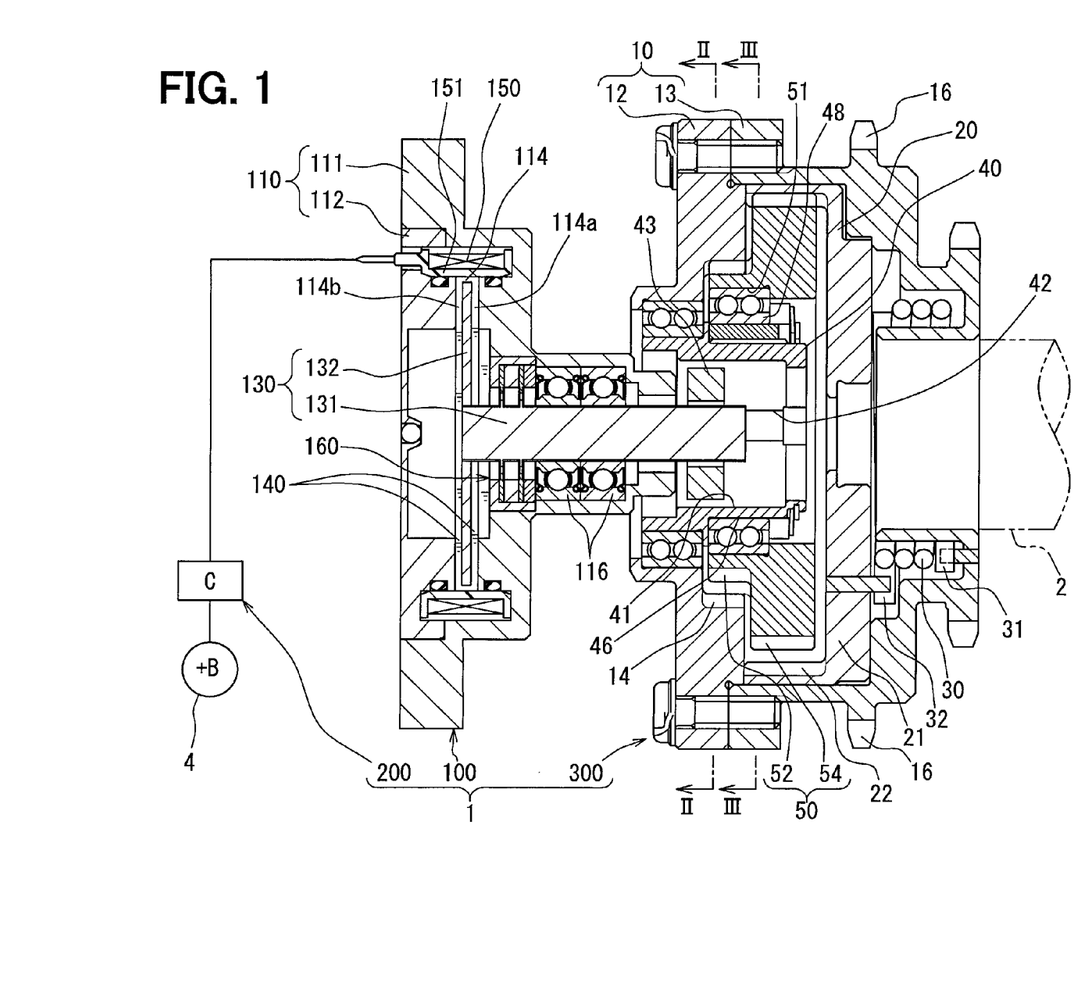
FIG. 1 is a schematic sectional view illustrating a variable valve timing apparatus including a fluid brake device according to a first embodiment of the present disclosure.
Figure 2:
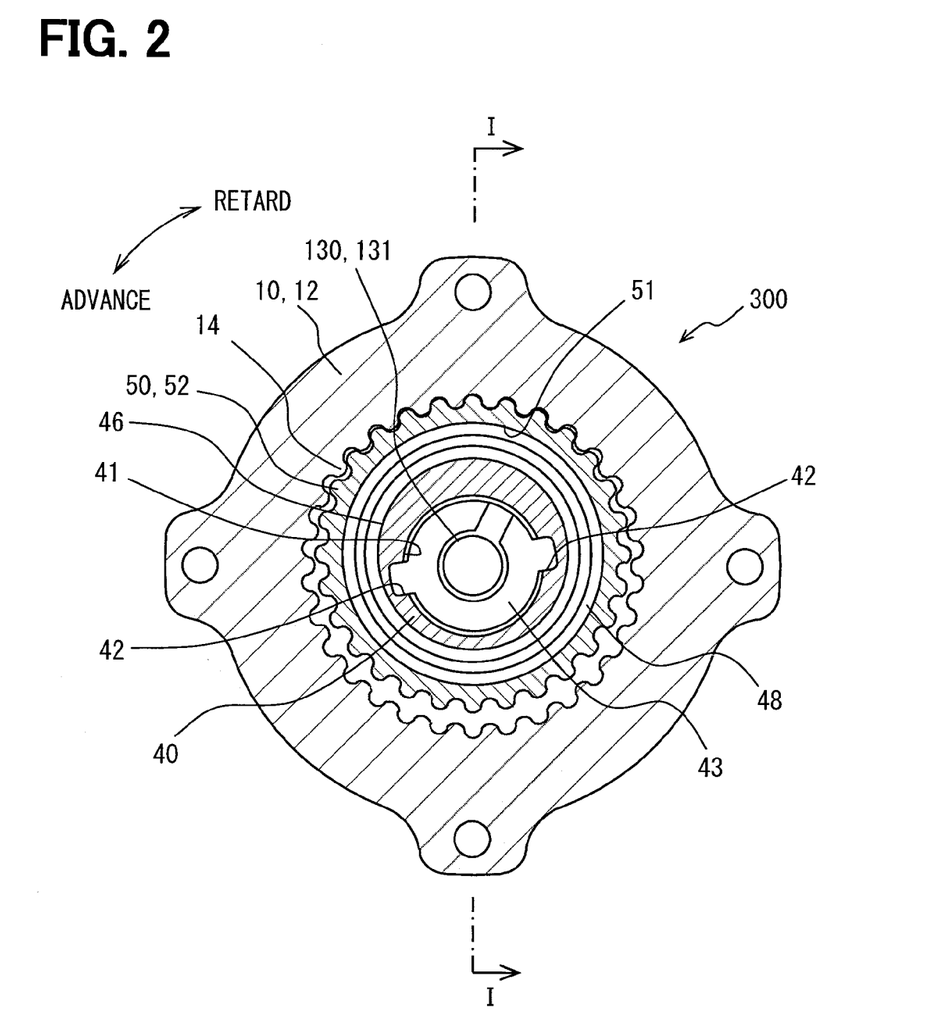
FIG. 2 is a sectional view taken along a line II-II of FIG. 1.

FIG. 1 is a cross-sectional view taken along a line I-I of FIG. 2 and shows a variable valve timing apparatus 1 having a fluid brake device 100 according to a first embodiment. The variable valve timing apparatus 1 is mounted on an engine of a vehicle. The variable valve timing apparatus 1 is installed in a torque transmission train which transmits engine torque to a camshaft 2 from a crankshaft (not shown). The camshaft 2 opens and closes an intake valve (not shown) of the engine through the transmission of the engine torque. The variable valve timing apparatus 1 controls a valve timing of the intake valve.

The variable valve timing apparatus 1 has a control circuit 200 and a phase adjusting mechanism 300 in addition to the fluid brake device 100. The control circuit 200 is a circuit supplying energizing current. The variable valve timing apparatus 1 provides appropriate valve timing for the engine by adjusting an engine phase which is a relative angular phase between the camshaft 2 and the crankshaft.

The fluid brake device 100 is provided with a case 110, a brake rotor 130, a magnetic viscosity fluid 140, a sealing device 160 and a solenoid coil 150.

The case 110 is formed in a hollow shape as a whole. The case 110 has a fixing member 111 and a cover member 112. The fixing member 111 has a cylindrical shape in which outside diameter is changed to form a step, and is made of magnetic materials. The fixing member 111 is fixed to a member of the engine, such as a chain cover (not shown). The cover member 112 has a round disc shape, and is made of magnetic materials. The cover member 112 is arranged to have the same axis as the fixing member 111, and opposes the phase adjusting mechanism 300 through the fixing member 111. The fixing member 111 and the cover member 112 are liquid-tightly tightened to form the case 110 and to define a fluid chamber 114 therebetween.

The rotor 130 includes a shaft 131 and a plate 132 securely fixed each other. The shaft 131 extends in an axis direction, and is made of magnetic materials. The shaft 131 penetrates the fixing member 111 of the case 110 between an inside and an outside of the case 110. One end of the shaft 131 extends to the outside of the case 110, and is engaged with the phase adjusting mechanism 300 at the outside of the case 110. Intermediate part of the shaft 131 is rotatably supported by a bearing 116 defined on the fixing member 111. Since the phase adjusting mechanism 300 receives the engine torque from the crankshaft, the rotor 130 receives a rotating torque in a counterclockwise direction in FIGS. 2 and 3 from the phase adjusting mechanism 300.

As shown in FIG. 1, the annular plate 132 made of magnetic materials is disposed on an outer surface of the shaft 131 and is located on an end portion of the shaft 131 opposite from the phase adjusting mechanism 300. The plate 132 spreads outward in the radial direction, and is accommodated in the fluid chamber 114. In the fluid chamber 114, the plate 132 and the fixing member 111 define a magnetic gap 114a in the axis direction. Similarly, the plate 132 and the cover member 112 define a magnetic gap 114b in the axis direction.

The magnetic viscosity fluid 140 is filled in the fluid chamber 114 having the magnetic gaps 114a and 114b. The magnetic viscosity fluid 140 is a kind of functional fluid. For example, the magnetic viscosity fluid 140 contains magnetic particles which are suspended in non-magnetic base liquid. For example, oil which is the same kind of lubrication oil for the internal combustion engine may be used as the base liquid. A powdered magnetic material such as carbonyl iron etc. may be used as the magnetic particles for the magnetic viscosity fluid 140.

Figure 4:
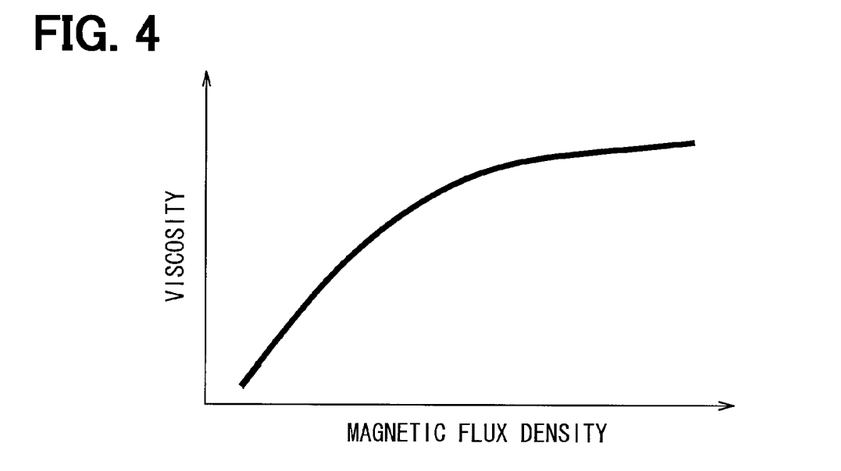
FIG. 4 is a graph illustrating characteristics of magnetic viscosity fluid of the fluid brake device.

Viscosity of the magnetic viscosity fluid 140 is varied according to a magnetic field intensity applied. In other word, viscosity of the magnetic viscosity fluid 140 is varied according to a magnetic flux density. As shown in FIG. 4, viscosity of the magnetic viscosity fluid 140 is raised according to increase in the magnetic flux density. Therefore, the yield stress is increased in proportion to the viscosity.

As shown in FIG. 1, the sealing device 160 is arranged between the fluid chamber 114 and the bearing 116 in the axis direction of the case 110. The sealing device 160 seals a space between the fixing member 111 of the case 110 and the brake shaft 131 of the brake rotor 130, thereby restricting the magnetic viscosity fluid 140 from leaking outside of the case 110.

The solenoid coil 150 is produced by winding a metal wire on a radial outside surface of a cylindrical bobbin 151. The solenoid coil 150 is disposed on a radial outside part of the plate 132 in a coaxial manner. The solenoid coil 150 is supported in the case 110, and is interposed between the fixing member 111 and the cover member 112 in the axis direction. The solenoid coil 150 is excited by being supplied with electric current, and generates a magnetic flux which passes through the fixing member 111, the magnetic gap 114a, the plate 132, the magnetic gap 114b, and the cover member 112.

Figure 3:
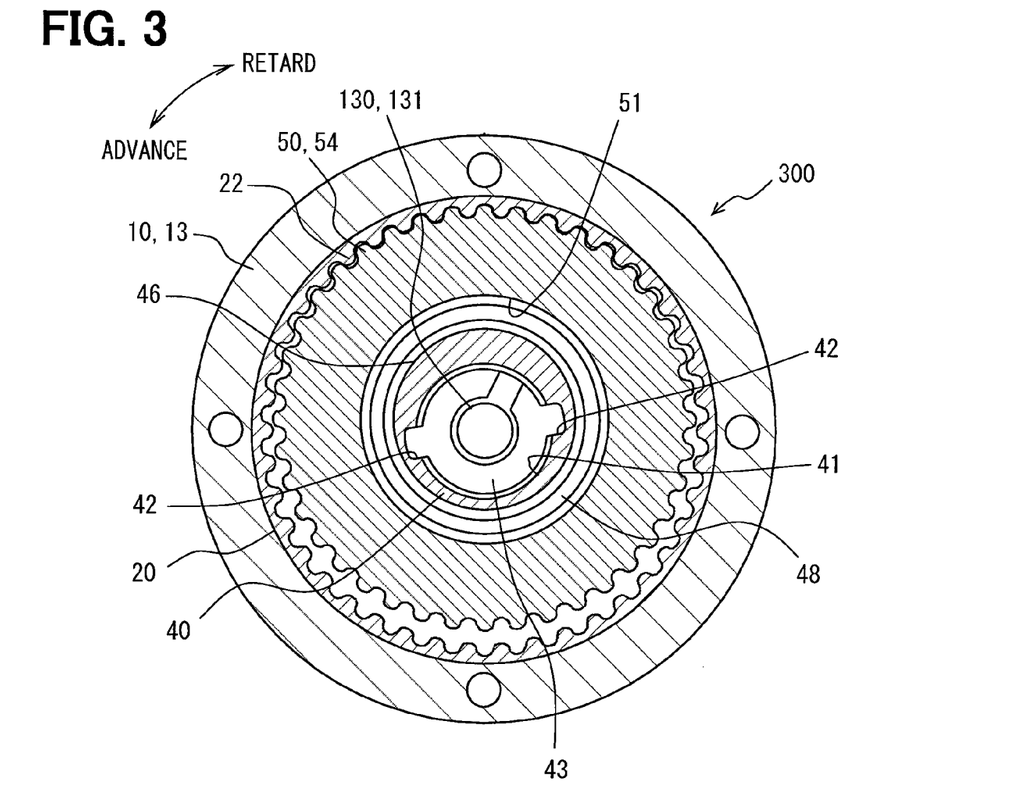
FIG. 3 is a sectional view taken along a line III-III of FIG. 1.

When the solenoid coil 150 generates the magnetic flux during counterclockwise rotation of the rotor 130 shown in FIGS. 2 and 3, the magnetic flux passes through the magnetic viscosity fluid 140 of the magnetic gaps 114a and 114b of the fluid chamber 114. A braking torque is generated between the case 110 and the rotor 130 which come in contact with the fluid 140 having the viscosity variation. Therefore, the plate 132 of the rotor 130 receives the braking torque in the clockwise direction in FIGS. 2 and 3, due to the viscosity resistance. As a result, the braking torque according to the viscosity of the fluid 140 is applied to the rotor 130 by supplying the magnetic flux by exciting the solenoid coil 150.

The control circuit 200 controls current supplied to the solenoid coil 150. The control circuit 200 is mainly constructed by a microcomputer. The control circuit 200 is disposed separately from the fluid brake device 100. The control circuit 200 is electrically connected with the solenoid coil 150 and a battery 4 arranged in the vehicle. During a stop of the engine, the control circuit 200 turns off a current supply to the solenoid coil 150 in response to a turning off an electric power supply from the battery 4. At this time, the solenoid coil 150 does not generate the magnetic flux, and does not generate the braking torque on the rotor 130.

On the other hand, during an operation of the engine, the control circuit 200 is supplied with the electric power from the battery 4, and controls an amount of current supply to the solenoid coil 150. As a result, the solenoid coil 150 generates a regulated amount of the magnetic flux which passes through the magnetic viscosity fluid 140. At this time, variable control of the viscosity of the magnetic viscosity fluid 140 is carried out. The braking torque applied to the rotor 130 is adjusted by the amount of the current supply to the solenoid coil 150.

As shown in FIG. 1, the phase adjusting mechanism 300 includes a driving rotor 10, a driven rotor 20, an assisting member 30, a planetary carrier 40, and a planetary gear 50.

The driving rotor 10 includes a gear member 12 and a chain wheel 13 which are made of metal. The gear member 12 and the chain wheel 13 are formed in cylindrical shapes and are fastened by screws in a coaxial manner. As shown in FIG. 2, the gear member 12 has a radial inside surface where a driving inner gear 14 is formed. A teeth tip circle has a diameter smaller than that of a teeth bottom circle in the gear 14. As shown in FIG. 1, the chain wheel 13 has a radial outside surface where a plurality of gear teeth 16 is formed. The gear teeth 16 of the chain wheel 13 is engaged with the crankshaft via a timing chain (not shown) and rotated synchronously with the crankshaft. Therefore, the driving rotor 10 is rotated in the counterclockwise direction in FIGS. 2 and 3 in response to the rotation of the crankshaft when the engine torque is transmitted to the chain wheel 13 from the crankshaft through the timing chain.

As shown in FIG. 1, the driven rotor 20 is formed in a cylindrical shape and is arranged in a radial inside of the chain wheel 13 in a coaxial manner. The driven rotor 20 has a connection part 21 on the bottom wall and the connection part 21 is fitted and connected to the camshaft 2 in a coaxial manner using screw. The driven rotor 20 is able to rotate in response to the rotation of the camshaft 2 and is able to have relative rotation relative to the driving rotor 10. The rotation direction of the driven rotor 20 is set in the counterclockwise direction of FIGS. 2 and 3, similarly to the driving rotor 10. The driven rotor 20 is interlocked with the camshaft 2, and is supported to relatively rotate with respect to the driving rotor 10.

As shown in FIG. 3, the driven rotor 20 has a radial inside surface where a driven inner gear 22 is formed. A teeth tip circle has a diameter smaller than that of a teeth bottom circle in the gear 22. The inside diameter of the driven inner gear 22 is set larger than that of the driving inner gear 14, and the number of teeth of the driven inner gear 22 is set greater than the number of teeth of the driving inner gear 14. The driven inner gear 22 is positioned away from the driving inner gear 14 in the axis direction, in a direction opposite from the fluid brake device 100.

As shown in FIG. 1, the assisting member 30 consists of a helical torsion metal spring. The assisting member 30 is coaxially arranged in an inside of the chain wheel 13. The assisting member 30 has one end 31 which is engaged with the chain wheel 13 and the other end 32 which is engaged with the connection part 21. The assisting member 30 generates assist torque when the assisting member 30 is twisted between the rotors 10 and 20. The assist torque urges and pushes the driven rotor 20 in a retarding direction with respect to the driving rotor 10.

As shown in FIGS. 1-3, the planetary carrier 40 is formed in a cylindrical shape as a whole and is made of metal. The planetary carrier 40 has a radial inside surface where a transfer part 41 which receives the braking torque from the rotor 130 is formed. The transfer part 41 is coaxially arranged with the rotors 10 and 20. The transfer part 41 has a pair of engaging grooves 42 and a connector 43 fitted with the grooves 42. The transfer part 41 of the planetary carrier 40 and the brake shaft 131 are engaged via the connector 43. The planetary carrier 40 is capable of rotating with the brake rotor 130, and is capable of having relative rotation relative to the driving rotor 10. The rotation direction of the planetary carrier 40 is set in the counterclockwise direction in FIGS. 2 and 3 when the engine is active, similarly to the brake rotor 130.

As shown in FIGS. 1-3, the planetary carrier 40 has a supporting portion 46 which supports the planetary gear 50. The supporting portion 46 is located eccentrically with respect to the rotors 10 and 20 and the brake shaft 131, and is coaxially engaged with a center hole 51 of the planetary gear 50 through a planetary bearing 48. The planetary gear 50 is supported by the supporting portion 46 in such a manner as to perform the planetary motion. The planetary gear 50 rotates about an eccentric axis of the supporting portion 46, and also the planetary gear 50 revolves relative to the planetary carrier 40. Thus, when the planetary carrier 40 performs relative rotation with respect to the driving rotor 10 in the revolution direction of the planetary gear 50, the planetary gear 50 performs the planetary motion.

The planetary gear 50 has a radial outside surface formed in a stepped cylindrical shape. The planetary gear 50 has a driving outer gear 52 and a driven outer gear 54 on the radial outside. The driving outer gear 52 is formed on a smaller diameter part of the gear 50, and the driven outer gear 54 is formed on a larger diameter part of the gear 50. The driving outer gear 52 and the driven outer gear 54 are coaxially arranged. The driving outer gear 52 intermeshes with the driving inner gear 14 only at a position where the planetary gear 50 is located by its orbiting motion. The driven outer gear 54 also intermeshes with the driven inner gear 22 only at a position where the planetary gear 50 is located by its orbiting motion. The outside diameter of the driven outer gear 54 is set larger than that of the driving outer gear 52, and the number of teeth of the outer gear 52, 54 is set smaller than the number of teeth of the inner gear 22, 14 by the same number.

The phase adjusting mechanism 300 adjusts the engine phase according to a balance of torques among the braking torque on the rotor 130, the assist torque of the assisting member 30, and the fluctuating torque acting on the camshaft 2 during the operation of the engine.

In a case where the braking torque is adjusted in a constant value in order to enable the rotor 130 to rotate with the drive rotor 10 in the same rotating speed, the planetary carrier 40 does not rotate relatively with respect to the driving inner gear 14. Then, the planetary gear 50 orbits synchronously with both the rotors 10 and 20 without performing relative rotation of the sun-and-planet motion. Therefore, the engine phase is maintained in a constant angular phase.

In a case where the braking torque is increased in order to enable the rotor 130 to rotate at a rotating speed that is slower than that of the drive rotor 10, the planetary carrier 40 relatively rotates in a retarding direction with respect to the driving inner gear 14. Then, the planetary gear 50 itself rotates by the sun-and-planet motion and orbits on the gears 14 and 22. Therefore, the driven rotor 20 is relatively rotated in an advancing direction with respect to the drive rotor 10. Therefore, the engine phase is advanced.

In a case where the braking torque is decreased in order to enable the rotor 130 to rotate at a rotating speed that is higher than that of the drive rotor 10, the planetary carrier 40 relatively rotates in an advancing direction with respect to the driving inner gear 14. Then, the planetary gear 50 itself rotates by the sun-and-planet motion and orbits on the gears 14 and 22. Therefore, the driven rotor 20 is relatively rotated in a retarding direction with respect to the drive rotor 10. Therefore, the engine phase is retarded.

Figure 5:
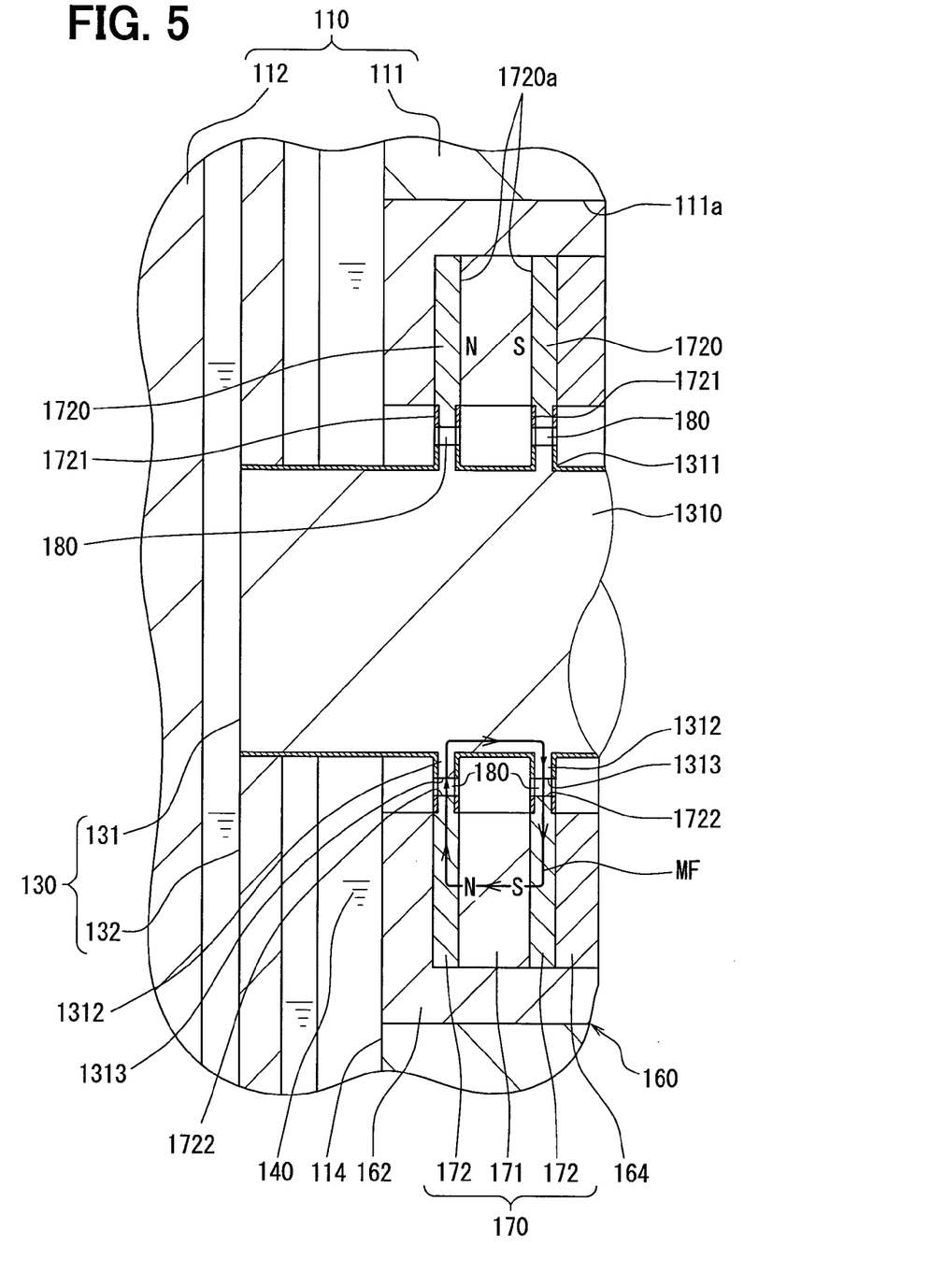
FIG. 5 is a partial enlarged sectional view illustrating the fluid brake device of FIG. 1.

As shown in FIG. 5, the brake shaft 131 has a magnetic shaft 1310 and a regulation layer 1311 that covers a predetermined part of the magnetic shaft 1310. In the following explanation, the inside of the case 110 which defines the fluid chamber 114 is referred as "case inside", and the outside of the case 110 in which the phase adjusting mechanism 300 is arranged is referred as "case outside". Moreover, the rotation direction of the brake shaft 131 is referred as "rotation direction".

The magnetic shaft 1310 is made of magnetic materials such as carbon steel, and has a pillar shape extended in the axis direction. The magnetic shaft 1310 has a magnetic protrusion 1312 at a position opposing to the inner circumference of the sealing device 160, and the protrusion 1312 opposes to a magnetic flux guide 172 in the radial direction. The magnetic protrusion 1312 may be a pair of the magnetic protrusions arranged in the axis direction, and the magnetic flux guide 172 may be a pair of the magnetic flux guides arranged in the axis direction.

Figure 6:
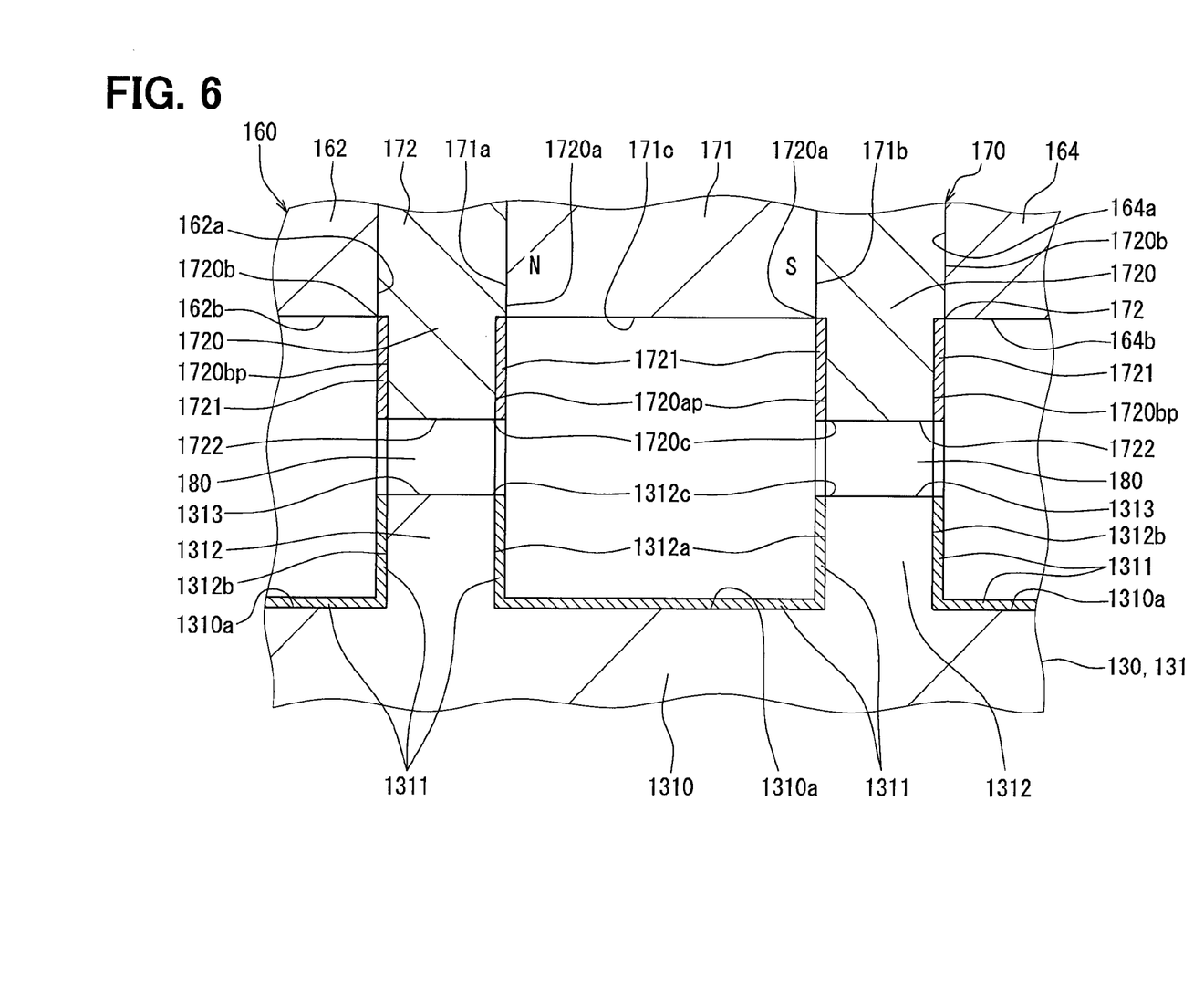
FIG. 6 is a partial enlarged sectional view illustrating the fluid brake device of FIG. 5.

As shown in FIG. 6, the magnetic protrusion 1312 projects from an outer circumference surface 1310a of the shaft 1310, and is located at two positions distanced from each other in the axis direction. The protrusion 1312 protrudes toward the corresponding magnetic flux guide 172, and is formed in an annular board shape continuously extending in the rotation direction.

Axial length (thickness) of the magnetic protrusion 1312 is set as approximately constant in the rotation direction. Therefore, as shown in FIG. 6, axial end surfaces 1312a and 1312b of the protrusion 1312 are flat surfaces spreading in the radial direction. Moreover, the outside diameter of the protrusion 1312 is set as approximately constant in the axis direction and the rotation direction. Therefore, a circumference face 1312c of the protrusion 1312 opposing to the corresponding guide 172 on the projection side is a cylindrical surface of a cylinder extending in the axis direction.

The regulation layer 1311 of the brake shaft 131 covers the outer circumference surface 1310a of the magnetic shaft 1310 and the axial end surfaces 1312a and 1312b of the protrusion 1312. For example, the regulation layer 1311 is non-magnetized by performing a surface treatment to the surfaces 1310a, 1312a, 1312b, or by plating nonmagnetic material on the surfaces 1310a, 1312a, 1312b. Thus, the regulation layer 1311 is made as a nonmagnetic layer which restricts the magnetic flux from passing.

In the surface treatment, for example, a refining element is applied to a portion to become a nonmagnetic layer, and the refining element is melted by heating and then cooled. Thus, only the desired portion can be processed into the nonmagnetic layer.

The circumference surface 1312c of the magnetic protrusion 1312 opposing to the flux guide 172 has an exposing part 1313 through which the magnetic shaft 1310 is exposed from the regulation layer 1311. The regulation layer 1311 continuously covers the surfaces 1310a, 1312a, 1312b of the magnetic shaft 1310 in the rotation direction and the axis direction, on both sides of the exposing part 1313 in the axis direction.

As shown in FIG. 5, the sealing device 160 is located in the case inside on the outer circumference side of the brake shaft 131, and causes the case exterior to be separated from the fluid chamber 114 filled with the magnetic viscosity fluid 140. The sealing device 160 has a main part 162, a spacer 164, and a magnetic sealing sleeve 170.

The main part 162 has a based cylindrical shape and is made of nonmagnetic material such as austenitic stainless steels. The main part 162 is coaxially arranged on the outer circumference side of the brake shaft 131 to surround the shaft 131 along the rotation direction. The main part 162 has an opening and a bottom. The opening is arranged to oppose the case exterior and the bearing 116, and the bottom is arranged to oppose the case inside and the fluid chamber 114.

The main part 162 is fitted and fixed to an annular concave portion 111a formed in the fixing member 111 of the case 110.

The spacer 164 is made of nonmagnetic material such as austenitic stainless steels, and is coaxially arranged on the outer circumference side of the brake shaft 131 to surround the shaft 131 along the rotation direction. The spacer 164 is fitted and fixed to the opening of the main part 162 of the sealing device 160.

The magnetic sealing sleeve 170 has a cylindrical shape as a whole, and includes a permanent magnet 171 and the pair of magnetic flux guides 172. The permanent magnet 171 is interposed between the pair of magnetic flux guides 172 in the axis direction. The sleeve 170 is coaxially arranged on the outer circumference side of the brake shaft 131 to surround the shaft 131 along the rotation direction.

The permanent magnet 171 has a cylindrical shape and is made of ferrite magnet, for example. The permanent magnet 171 continuously extends in the rotation direction and is fitted and fixed to the main part 162 of the sealing device 160. The permanent magnet 171 forms N-pole and S-pole on the both ends, respectively, in the axis direction, respectively, and always generates magnetic flux MF between the N-pole and the S-pole.

As shown in FIG. 6, the axial length of the permanent magnet 171 is set as approximately constant in the rotation direction, so that both axial end surfaces 171a and 171b of the magnetic 171 are made flat along the radial direction. Moreover, the inside diameter of the permanent magnet 171 is set as approximately constant in the axis direction and the rotation direction, so that an inner circumference surface 171c of the magnetic 171 is made of a cylindrical surface of a cylinder extending along the axis direction.

As shown in FIG. 5, each of the flux guide 172 has a magnetic ring 1720 and a regulation layer 1721. A specific portion of the magnetic ring 1720 is covered with the regulation layer 1721 of the guide 172, which continuously extends in the rotation direction and is fitted and fixed to the main part 162 of the sealing device 160. In detail, the main part of the flux guide 172 is constructed of the magnetic ring 1720 which is made of magnetic materials such as carbon steel. The ring 1720 has a ring board shape which continuously extends in the rotation direction.

As shown in FIG. 6, the axial length (thickness in the axis direction) of the magnetic ring 1720 is set as approximately constant in the rotation direction, so that both axial end surfaces 1720a, 1720b of the ring 1720 are made flat along the radial direction. Moreover, the inside diameter of the magnetic ring 1720 is set as approximately constant in the axis direction and the rotation direction, so that a circumference surface 1720c of the ring 1720, which opposes to the exposing part 1313 of the corresponding magnetic protrusion 1312, is made of a cylindrical surface of a cylinder extending along the axis direction.

The axial end surface 1720a of the flux guide 172 is located directly adjacent to the corresponding axial end surface 171a, 171b of the permanent magnet 171 through a surface contact. Moreover, the axial end surface 1720b of the flux guide 172 is located directly adjacent to a bottom 162a of the main part 162 of the sealing device 160 or an axial end surface 164a of the spacer 164 of the sealing device 160 through a surface contact. Furthermore, the magnetic ring 1720 of the flux guide 172 is projected toward the exposing part 1313 of the corresponding magnetic protrusion 1312 rather than the inner circumference surface 171c, 162b, 164b of the permanent 171, the main part 162, or the spacer 164.

The regulation layer 1721 of the flux guide 172 covers a part of the axial end surface 1720a of the ring 1720 located adjacent to the permanent magnet 171. Specifically, the regulation layer 1721 of the flux guide 172 covers a projection part 1720ap of the surface 1720a projected rather than the magnet 171.

Moreover, the regulation layer 1721 of the flux guide 172 covers a part of the axial end surface 1720b of the ring 1720 located adjacent to the main part 162 or the spacer 164. Specifically, the regulation layer 1721 of the flux guide 172 covers a projection part 1720 bp of the surface 1720b projected rather than the main part 162 or the spacer 164.

For example, the regulation layer 1721 is non-magnetized by performing a surface treatment to the surface 1720a, 1720b, or by plating nonmagnetic material on the surface 1720a, 1720b. Thus, the regulation layer 1721 is made as a nonmagnetic layer which restricts the magnetic flux from passing. In the surface treatment, for example, a refining element is applied to a portion to become a nonmagnetic layer, and the refining element is melted by heating and then cooled. Thus, only the desired portion can be processed into the nonmagnetic layer.

The circumference surface 1720c of the flux guide 172 opposing to the corresponding magnetic protrusion 1312 has an exposing part 1722 through which the magnetic ring 1720 is exposed from the regulation layer 1721. In each of the flux guides 172, the regulation layer 1721 continuously covers the axial end surface 1720a, 1720b of the magnetic ring 1720 in the rotation direction, on both sides of the exposing part 1722 in the axis direction. Moreover, a circular seal gap 180 is defined between the exposing part 1722 of the flux guide 172 and the exposing part 1313 of the magnetic protrusion 1312, and continuously extends in the rotation direction. The seal gap 180 communicates with the fluid chamber 114, as shown in FIG. 5.

The magnetic flux MF generated by the permanent magnet 171 is introduced to the axial end face 1720a of the magnetic ring 1720 which is located directly adjacent to the magnet 171 and is not covered with the regulation layer 1721. Thereby, the magnetic flux MF passes through the axial end face 1720a and is guided from the exposing part 1722 of the magnetic ring 1720 through the seal gap 180 to the exposing part 1313 of the magnetic protrusion 1312.

The projection 1720ap, 1720 bp of the axial end surface 1720a, 1720b of the magnetic ring 1720 of the flux guide 172 is projected rather than the magnet 171, the main part 162, and the spacer 164, and is continuously covered with the regulation layer 1721 in the rotation direction, thereby restricting the magnetic flux MF from passing.

Moreover, on the both sides of the exposing part 1313 of the brake shaft 131 in the axis direction, the outer circumference surface 1310a of the magnetic shaft 1310 and the axial end face 1312a, 1312b of the magnetic protrusion 1312 are continuously covered with the regulation layer 1311 in the rotation direction, thereby restricting the magnetic flux MF from passing.

According to the first embodiment, the magnetic ring 1720 and the magnetic protrusion 1312 protrude toward each other. Therefore, the exposing parts 1722, 1313 oppose to each other in the most close state. Thus, the magnetic flux MF is intensively guided through the seal gap 180 located between the exposing parts 1722, 1313.

Because the magnetic flux MF can pass through the seal gap 180 with the expected density, the magnetic viscosity fluid 140 flows into the seal gap 180 from the fluid chamber 114 by magnetic attraction force action on the magnetic particles. Therefore, the viscosity of the magnetic viscosity fluid 140 flowing into the seal gap 180 is raised in response to the magnetic flux MF, and is caught into a film state as a self-sealing film. The self-sealing film has high resistance to pressure, and restricts the magnetic viscosity fluid 140 from flowing out of the case 110. Therefore, the magnetic viscosity fluid 140 can be restricted from leaking out of the case 110.

Thus, according to the first embodiment, the brake characteristic of the fluid brake device 100 can be restricted from varying because the magnetic viscosity fluid 140 is restricted from leaking. Therefore, the engine phase angle can be accurately controlled. Furthermore, the self-sealing film formed in the seal gap 180 with the magnetic viscosity fluid 140 can reduce the friction drag for the brake shaft 131, so that the torque loss which originates in the friction drag can be reduced to maintain the fuel consumption. In addition, the solenoid coil 150 and the control circuit 200 construct the "a control device which carries out variable control of the viscosity of the magnetic viscosity fluid by varying the magnetic flux" in the first embodiment.

(Second Embodiment)

Figure 7:
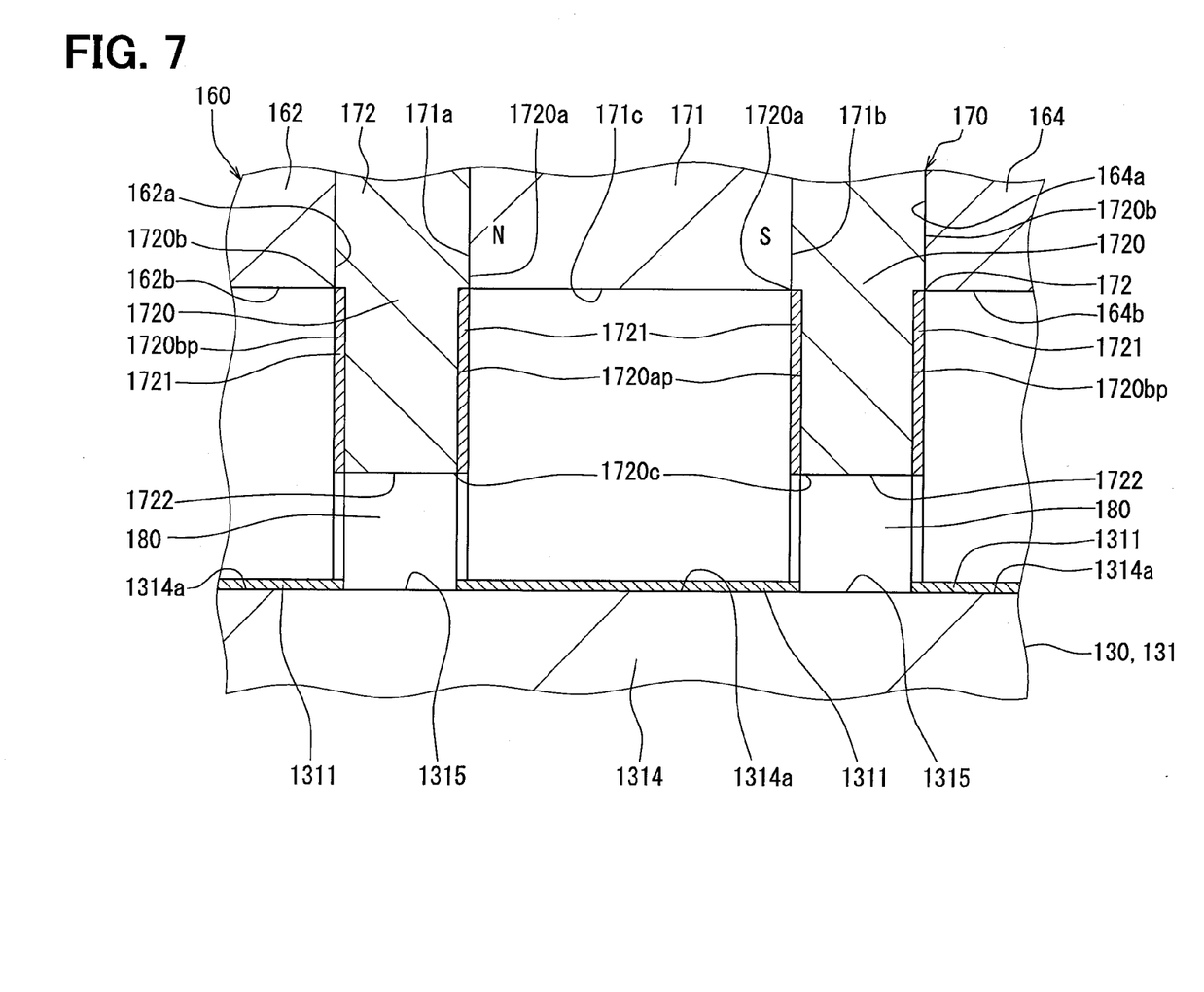
FIG. 7 is a partial enlarged sectional view illustrating a fluid brake device according to a second embodiment of the present disclosure.

FIG. 7 shows a second embodiment which is a modification of the first embodiment. In the second embodiment, a magnetic shaft 1314 of the brake shaft 131 does not have the magnetic protrusion 1312. The magnetic shaft 1314 has an exposing part 1315 at the positions of the protrusions 1312. An outer circumference surface 1314a of the shaft 1314 is covered with the regulation layer 1311 made of nonmagnetic plating. A part of the outer circumference surface 1314a opposing to the exposing part 1722 of the flux guide 172 has the exposing part 1315, and the shaft 1314 is exposed from the regulation layer 1311 through the exposing part 1315.

According to the second embodiment, the outer circumference surface 1314a of the shaft 1314 is covered with the regulation layer 1311 continuously in the rotation direction, on the both sides of the exposing part 1315 in the axis direction. The regulation layer 1311 restricts the magnetic flux MF from passing.

Further, the projection 1720ap, 1720 bp of the magnetic ring 1720 protrudes toward the exposing part 1315 in the second embodiment. The projection 1720ap, 1720 bp is covered with the regulation layer 1721 continuously extending in the rotation direction, so that the magnetic flux MF is restricted from passing.

Therefore, the exposing parts 1722, 1315 oppose to each other in the most close state. Thus, the magnetic flux MF is intensively guided through the seal gap 180 located between the exposing parts 1722, 1315. The density of the magnetic flux MF is increased in the seal gap 180, and the pressure withstanding properties of the self-sealing film is raised. Accordingly, the brake characteristic of the fluid brake device 100 can be restricted from varying because the magnetic viscosity fluid 140 is restricted from leaking. Further, the engine phase angle can be accurately controlled.

(Third Embodiment)

Figure 8:
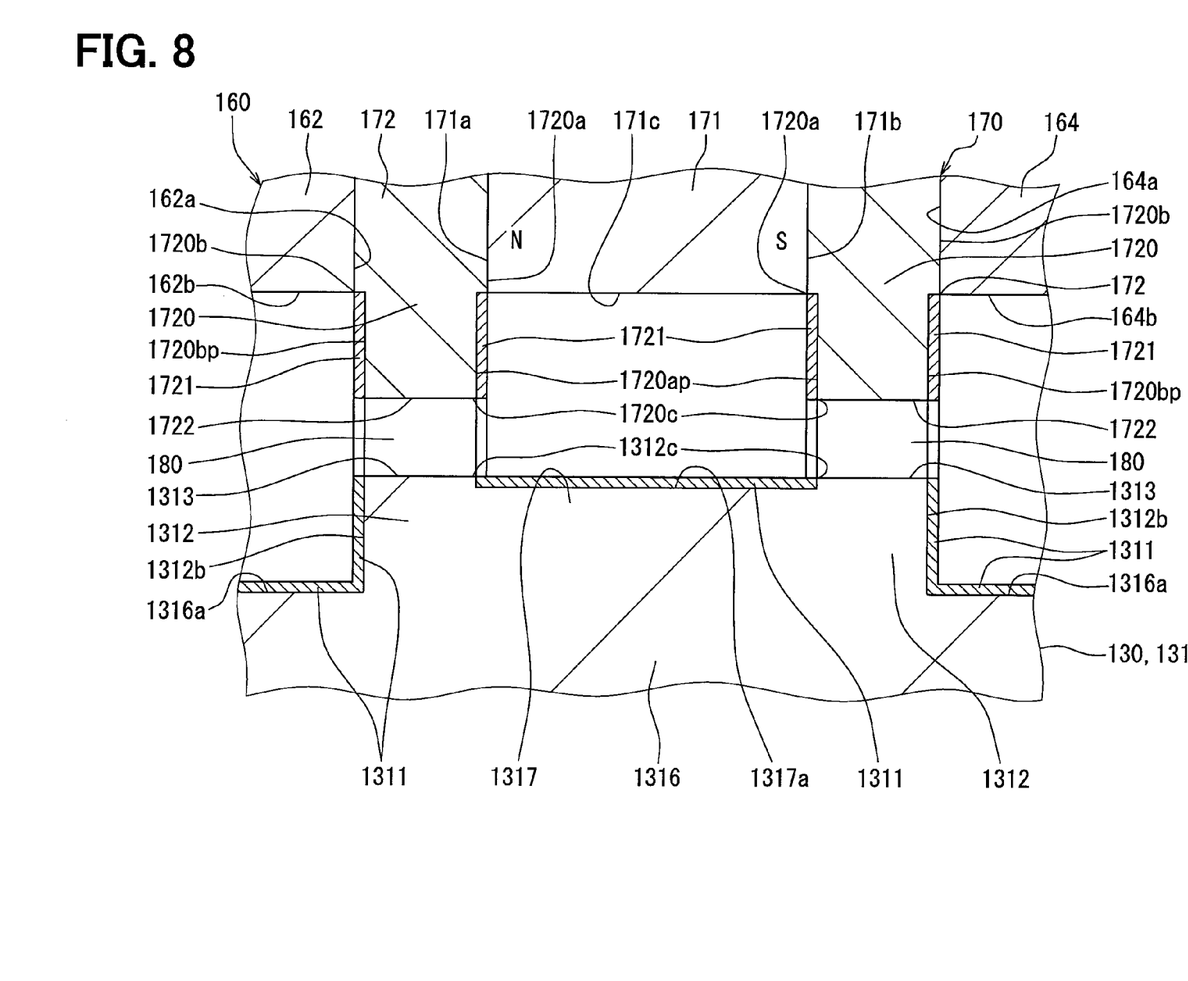
FIG. 8 is a partial enlarged sectional view illustrating a fluid brake device according to a third embodiment of the present disclosure.

FIG. 8 shows a third embodiment which is a modification of the first embodiment. In the third embodiment, a magnetic shaft 1316 of the brake shaft 131 has a connection projection 1317 that connects the projections 1312 in the axis direction with approximately the same outside diameter. Therefore, the axial end surface 1312a of the first embodiment is eliminated. The regulation layer 1311 covers an outer circumference surface 1316a of the shaft 1316, the axial end surface 1312b of the projection 1312, and a cylindrical surface 1317a of the connection projection 1317 that opposes to the inner circumference surface 171c of the permanent magnet 171 in the radial direction.

According to the third embodiment, the surfaces 1317a, 1316a, 1312b of the shaft 1316 are covered with the regulation layer 1311 continuously extending in the rotation direction and the axis direction, on the both sides of the exposing part 1313 of the brake shaft 131 in the axis direction. The regulation layer 1311 restricts the magnetic flux MF from passing.

Further, the projection 1720ap, 1720 bp of the magnetic ring 1720 protrudes toward the exposing part 1313, and is covered with the regulation layer 1721 continuously extending in the rotation direction, so that the magnetic flux MF is restricted from passing.

Therefore, the exposing parts 1722, 1313 oppose to each other in the most close state with each other. Thus, the magnetic flux MF is intensively guided through the seal gap 180 located between the exposing parts 1722, 1313. The density of the magnetic flux MF is increased in the seal gap 180, and the pressure withstanding properties of the self-sealing film is raised. Accordingly, the brake characteristic of the fluid brake device 100 can be restricted from varying because the magnetic viscosity fluid 140 is restricted from leaking. Further, the engine phase angle can be accurately controlled.

(Other Embodiments)

The present disclosure should not be limited to the above embodiments, but may be implemented in other ways without departing from the sprit of the disclosure.

In the first embodiment, at least one of the axial end face 1312a and the axial end face 1312b may be exposed outside without being covered with the regulation layer 1311. Moreover, in the third embodiment, the axial end face 1312b of the magnetic protrusion 1312 may be exposed outside without being covered with the regulation layer 1311.

In the first to third embodiments, the inside diameter of the surface 1312c, 1314a, 1720c having the exposing part 1313, 1315, 1722 may be varied in the axis direction so as to have a tapered surface. Furthermore, the inside diameter of the surface 1312c, 1314a, 1720c having the exposing part 1313, 1315, 1722 may be varied in the radial direction.

Figure 9:
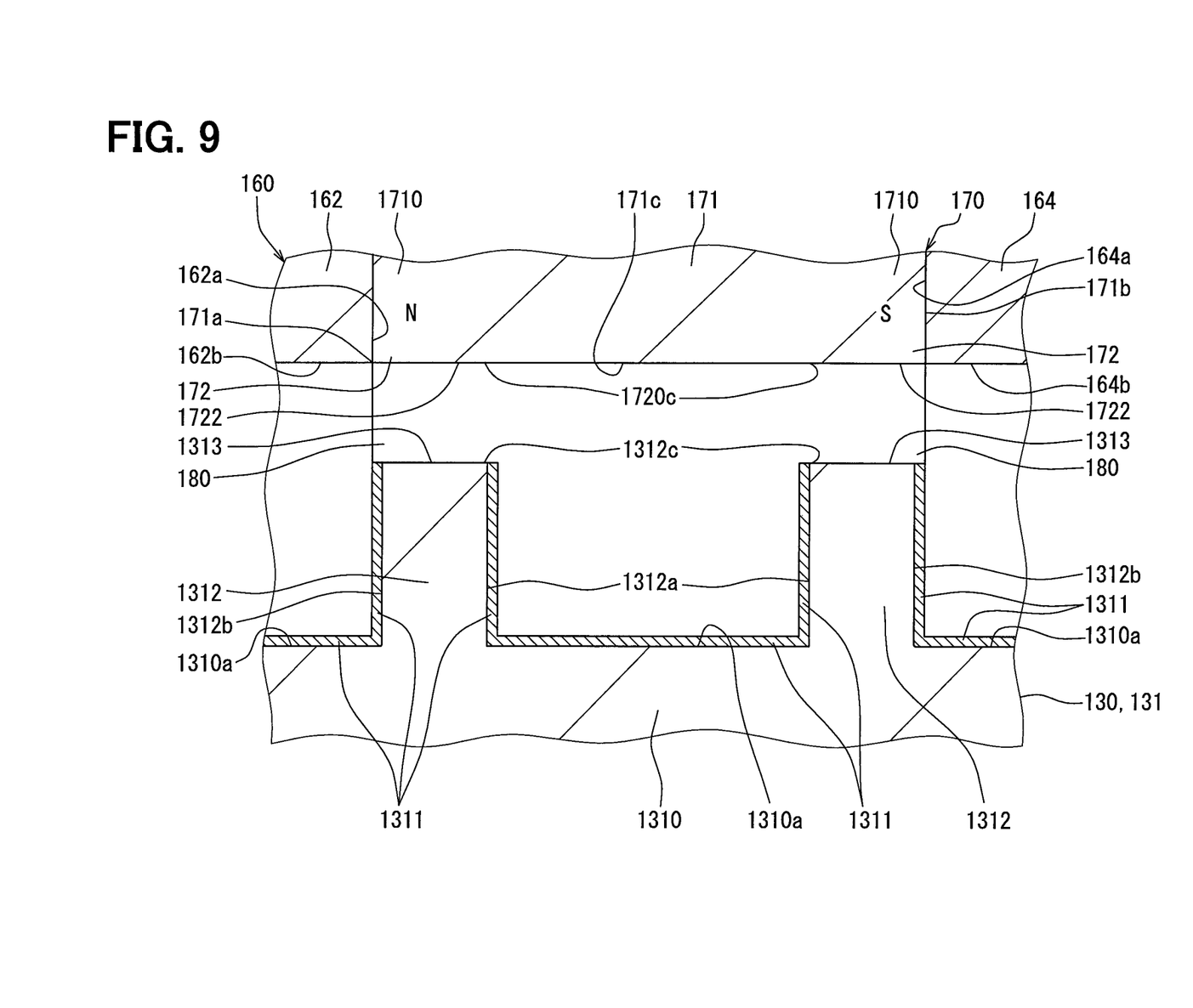
FIG. 9 is a partial enlarged sectional view illustrating a modification example of the fluid brake device of the first embodiment.
Figure 10:
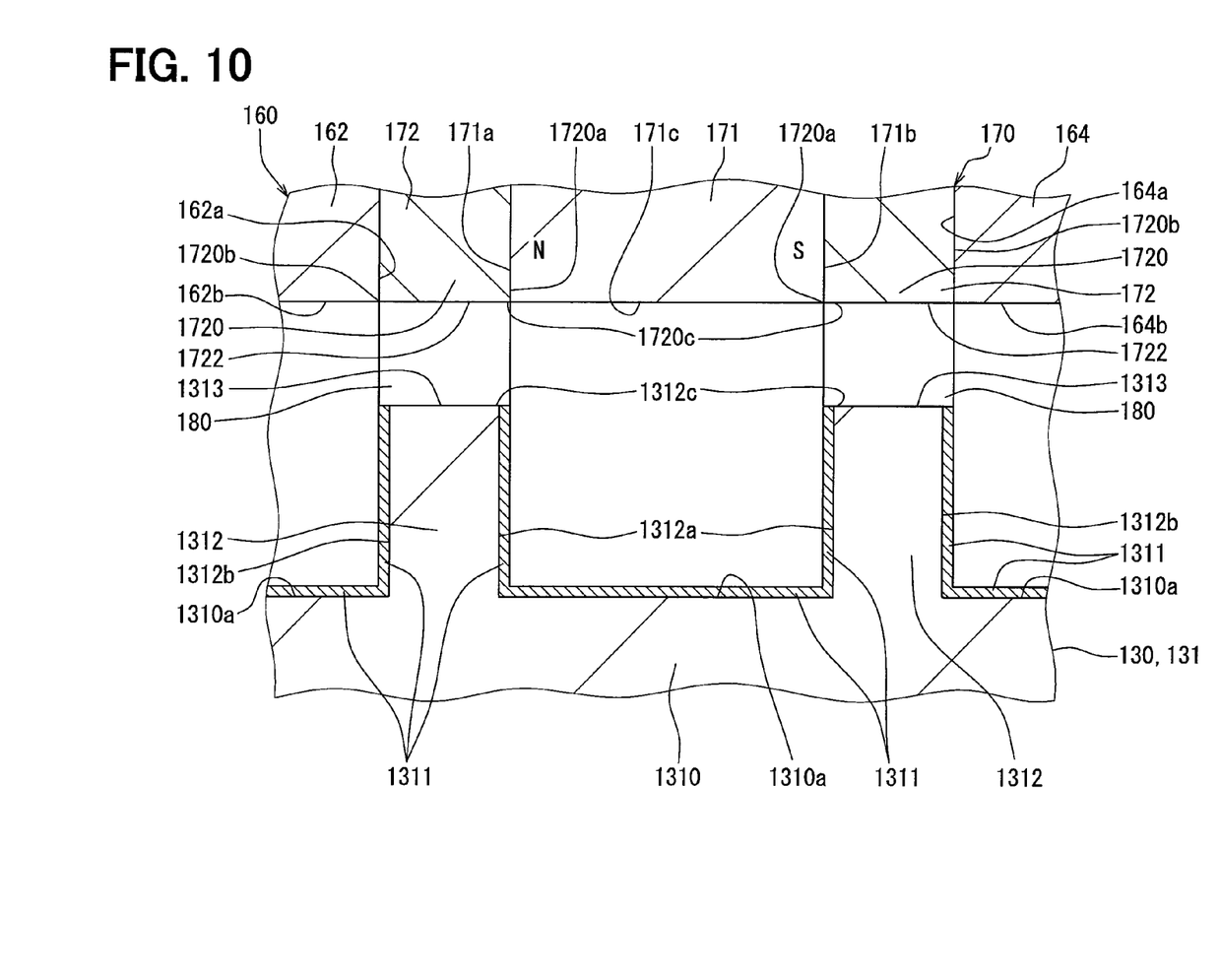
FIG. 10 is a partial enlarged sectional view illustrating a modification example of the fluid brake device of the first embodiment.

In the first to third embodiments, at least one of the axial end face 1720a and the axial end face 1720b of the magnetic ring 1720 may be exposed outside without being covered with the regulation layer 1721. Moreover, as shown in FIG. 9, the magnetic ring 1720 may be eliminated, and the flux guide 172 may be constructed of both axial end portions 1710 of the permanent magnet 171. Furthermore, as shown in FIGS. 9 and 10, the permanent magnet 171 or the magnetic ring 1720 may not have a projection projecting rather than the inner circumference surface 171c of the permanent magnet 171. In this case, the regulation layer 1721 may be eliminated.

In the first to third embodiments, a plurality of flux guides 172 may be arranged in the axis direction on at least one side (case outside and/or case inside) of the permanent magnet 171. Moreover, in that case, a plurality of exposing parts 1313, 1315 may be arranged in the axis direction correspondingly to the exposing parts 1722 of the flux guides 172. If necessary, the regulation layer 1311 may be arranged between the exposing parts 1313, 1315. Furthermore, the regulation layer 1311, 1721 may be a weak-magnetic layer having weak magnetism that is able to regulate the magnetic flux than the magnetic shaft 1310, 1314, 1316 or the magnetic ring 1720, for example. Although the present disclosure is applied to the intake valve, the present disclosure may be applied to an apparatus for controlling valve timing of an exhaust valve or an apparatus for controlling valve timing of an intake valve and an exhaust valve. Further, the present disclosure may be applied to a variety of apparatuses using the braking torque.

Although the present disclosure has been fully described in connection with the preferred embodiments thereof with reference to the accompanying drawings, it is to be noted that various changes and modifications will become apparent to those skilled in the art. Such changes and modifications are to be understood as being within the scope of the present disclosure as defined by the appended claims.

What is claimed is:

1. A fluid brake device comprising:
a case defining a fluid chamber inside;
magnetic viscosity fluid kept in the fluid chamber, the magnetic viscosity fluid having a viscosity variable in accordance with magnetic flux passing through;
a control device which carries out variable control of the viscosity of the magnetic viscosity fluid by varying the magnetic flux;
a rotor having a brake shaft penetrating the case to come into contact with the magnetic viscosity fluid so that the rotor receives a braking torque according to the viscosity of the magnetic viscosity fluid; and
a sealing sleeve arranged in the case to surround the brake shaft along a rotation direction, a seal gap being defined between the sealing sleeve and the brake shaft and communicating with the fluid chamber, wherein
the sealing sleeve has a flux guide that guides magnetic flux to the brake shaft through the seal gap,
the brake shaft has
a magnetic shaft extending in an axis direction,
a regulation layer that regulates the magnetic flux by covering an outer circumference surface of the magnetic shaft, and
an exposing part opposing to the flux guide, the brake shaft being exposed from the regulation layer through the exposing part.

2. The fluid brake device according to claim 1, wherein the regulation layer continuously extends in the rotation direction to cover the outer circumference surface of the magnetic shaft, and is located on both sides of the exposing part in the axis direction.

3. The fluid brake device according to claim 1, wherein the brake shaft has a magnetic projection projecting from the outer circumference surface of the magnetic shaft toward the flux guide, and
the magnetic projection has a circumference face opposing to the flux guide, and the circumference face of the magnetic projection has the exposing part.

4. The fluid brake device according to claim 3, wherein the magnetic projection has an axial end face in the axis direction, and
the regulation layer covers the outer circumference surface of the magnetic shaft and the axial end face of the magnetic projection.

5. The fluid brake device according to claim 1, wherein the flux guide of the sealing sleeve protrudes toward the exposing part.

6. The fluid brake device according to claim 5, wherein the flux guide has a magnetic ring continuously extending in the rotation direction and a regulation layer covering an axial end face of the magnetic ring in the axis direction to regulate the magnetic flux from passing,
the flux guide protruding toward the exposing part has a circumference face opposing to the exposing part of the brake shaft, and the circumference face of the flux guide has an exposing part, and
the magnetic ring is exposed from the regulation layer of the flux guide through the exposing part of the flux guide.

7. The fluid brake device according to claim 6, wherein
the sealing sleeve has a cylindrical permanent magnet continuously extending in the rotation direction,
the axial end face of the magnetic ring protrudes toward the exposing part of the brake shaft rather than an inner circumference surface of the permanent magnet, and
the axial end face of the magnetic ring is located adjacent to an axial end face of the permanent magnet in the axis direction such that the flux guide guides magnetic flux generated by the permanent magnet to the brake shaft, and
the regulation layer of the flux guide covers the axial end face of the magnetic ring protruding toward the exposing part of the brake shaft.

8. A variable valve timing apparatus that controls valve timing of a valve which is opened and closed by a camshaft driven by torque transmission from a crankshaft in an internal combustion engine, the apparatus comprising: the fluid brake device according to claim 1; and an angular phase adjusting mechanism engaged with the brake shaft at an outside of the case, wherein
the angular phase adjusting mechanism adjusts a relative phase defined between the crankshaft and the camshaft according to the braking torque acting on the rotor.

\* \* \* \* \*